United States Patent [19]

Chou

[11] Patent Number: 4,958,417

[45] Date of Patent: Sep. 25, 1990

[54] ATTACHMENT DEVICE FOR STRAP END

[76] Inventor: An C. Chou, No. 212, Yung-An St., Tainan, Taiwan

[21] Appl. No.: 500,183

[22] Filed: Mar. 28, 1990

[51] Int. Cl.$^5$ ............................ A44C 5/18; F16B 1/00
[52] U.S. Cl. ................................. 24/265 R; 24/265 A
[58] Field of Search ............. 24/265 R, 265 A, 265 C, 24/265 BC, 265 EC, 20 CW, 20 W, 20 EE; 224/150

[56] References Cited

U.S. PATENT DOCUMENTS

| | | | |
|---|---|---|---|
| 943,135 | 12/1909 | Boyer | 24/265 A |
| 1,944,646 | 1/1934 | McMurray | 24/265 A |
| 2,619,700 | 12/1952 | Turek | 24/265 A |
| 2,806,275 | 9/1957 | Stoll | 24/265 BC |
| 3,296,673 | 1/1967 | Kirkpatrick | 24/265 A |
| 4,387,490 | 6/1983 | Blackburn et al. | 24/265 A |
| 4,765,035 | 8/1988 | Servay | 24/265 A |
| 4,827,578 | 5/1989 | Heckerman et al. | 24/265 A |

Primary Examiner—Victor N. Sakran
Attorney, Agent, or Firm—Morton J. Rosenberg; David I. Klein

[57] ABSTRACT

An overlapped end of a strap is secured to a member such as a hook by an attachment device comprising a substantially U-shaped clamp made of deformable material such as metal plate and having a flat bottom formed with a plurality of openings, a securing member including a plate body formed with a plurality of openings and rivets. Said overlapped end of strap extends between the securing member and flat bottom of the clamp for connection by press to flatten side walls of the clamp and plunge the rivets into corresponding openings in the securing member and clamp member by piercing the overlapped end of the strap with bottom ends of the rivet being hammered flat under the flat bottom of the clamp member to prevent slipping.

1 Claim, 4 Drawing Sheets

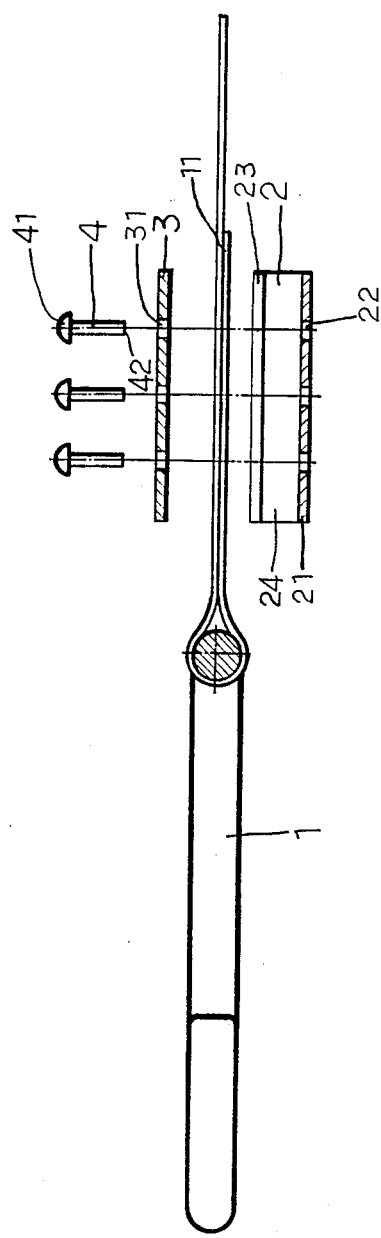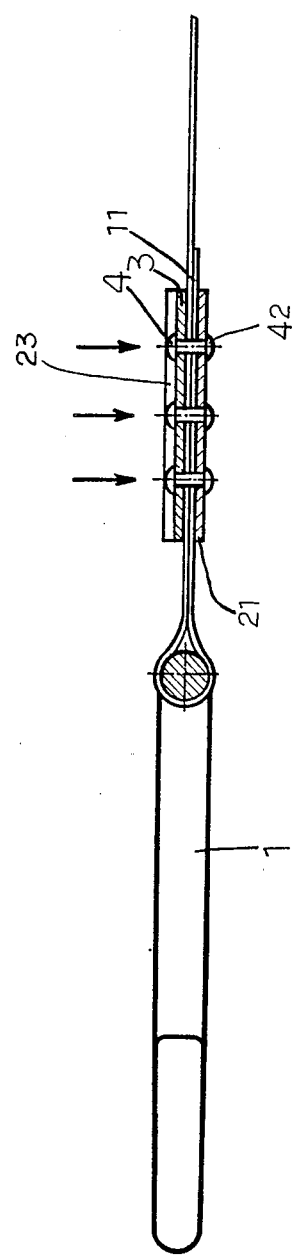

ATTACHMENT DEVICE FOR STRAP END

BACKGROUND OF THE INVENTION

This invention relates to an attachment device such as a splice in strap made of strong cloth material such as canvas and the like.

It is known to provide sewing connections between overlapped strap ends. As shown in FIG. 1, a hook member 1 terminates with a ring member 17 which is received by a return-bent end of a strap 11. An upper segment of strap 11 is inserted through the opening of the ring member 17 and further returned to overlap a lower segment of the strap 11. The upper and lower overlapped segments are generally attached by sewing a substantially rectangular pattern including side lines 12, 13, 15, 16 and diagonal lines 14. It is found disadvantageous that the attachment between the upper and lower segments may become loose and further separate by long-lasting tension transmitted therein. To this end, the inventor has attempted to make an improved attachment device for strap end to overcome the drawbacks of a known device.

SUMMARY OF THE INVENTION

An object of this invention is to provide an attachment device for strap end which can diminish the disadvantage of a known attachment.

It is another object of this invention to provide an attachment device which enables a rapid and tough connection between overlapped segments of a strap.

With the above object in view, the invention provides an attachment device for connection of an overlapped segments of a strap forming means for securing to a member such as a hook member. Said attachment device comprises a substantially U-shaped clamp made of deformable material such as metal plate and having a flat bottom formed with a plurality of openings, a securing member including a plate body formed with a plurality of openings and rivets. Said overlapped end of strap extends between the securing member and flat bottom of the clamp for connection by press to flatten side walls of the clamp and plunge the the rivets into corresponding openings in the securing member and the clamp member by piercing the overlapped end of the of the strap with bottom ends of the rivets being hammered flat under the flat bottom of the clamp member to prevent slipping.

BRIEF DESCRIPTION OF THE DRAWINGS

An embodiment of the invention is shown, by way of example, in the accompanying drawings, in which:

FIG. 3 is a cross-sectional view of the device of this invention, which is in a prior-to-attachment state, applied to an overlapped end of a strap which is attached to a hook member;

FIG. 4 is a similar view to FIG. 3 wherein the device of this invention is in a connecting state.

DETAILED DESCRIPTION OF THE PREFERRED EMBODIMENT

Figure 1:
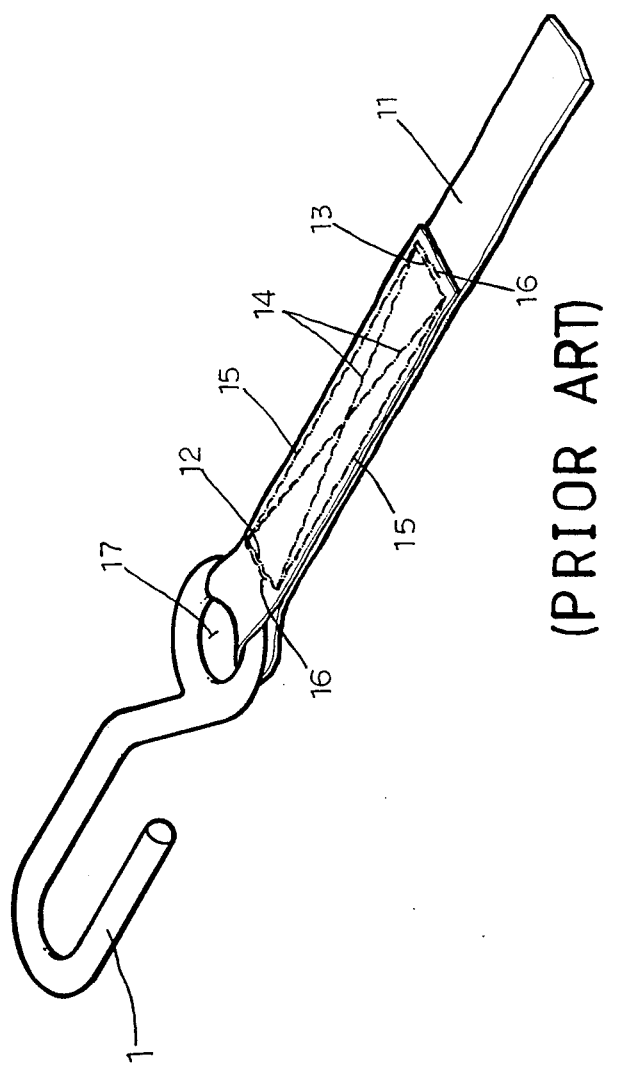
FIG. 1 is a perspective view illustrating a known art to secure return-bent and overlapped end of a strap which is attached to a hook member.
Figure 2:
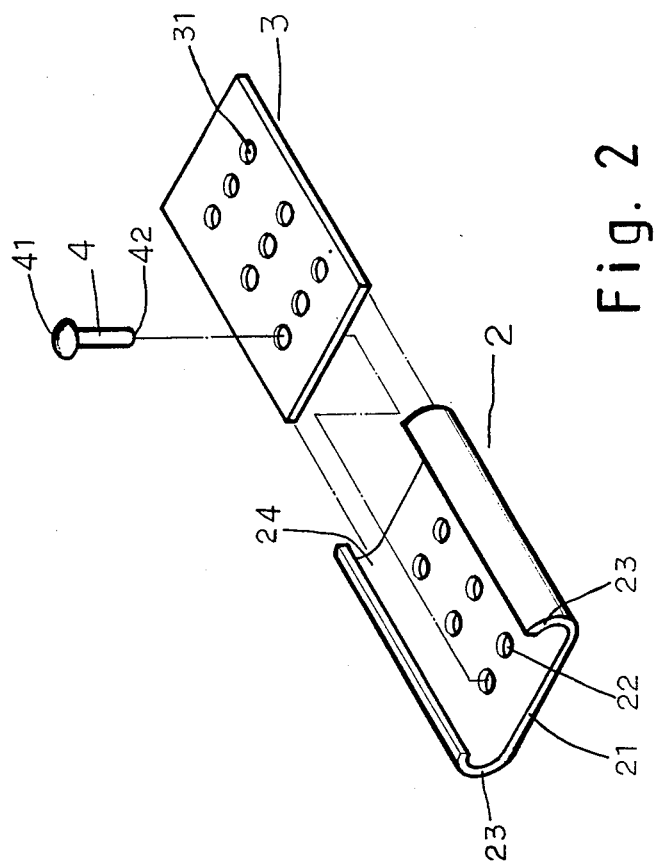
FIG. 2 is an exploded perspective view showing the preferred embodiment of this invention.

Referring to FIG. 2, the attachment device according to this invention comprises a perforated clamp member 2 made of deformable material such as metal plate, a perforated securing piece 3 and a plurality of rivets 4 only one is shown in FIG. 2).

Said clamp member 2 is substantially of U-shape which has a flat bottom 21 formed with a plurality of perforations 22 and opposed side walls 23 of which the free ends are bent inwardly to define a longitudinally space 24 therebetween.

The securing piece 3 is a rectangular plate in shape which is formed with a plurality of openings 31 and so dimensioned to be located in the space 24 defined in the clamp member 2 over the flat bottom of the clamp member 2 with the openings 31 thereof matching the openings 22 of the clamp member 2 and further define a longitudinal passage between the securing piece 3 and the flat bottom 21 of the clamp member 2.

Each of the rivets 4 has a flattening top end 41 and a bottom end 42 shaped to pierce the strap 11 when hammered at its top end 41.

Figure 5:
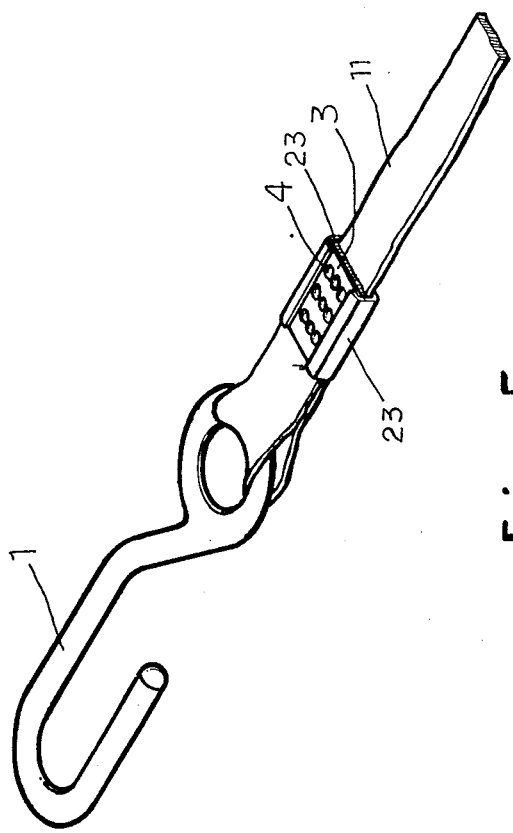
FIG. 5 is a perspective view corresponding to FIG. 4.

As shown in FIGS. 3, 4 and 5, in operation, the securing member 3 is positioned in the space 24 in the clamp member 2 with the openings 31 thereof matching the openings 22 in the flat bottom 21 of the clamp member 2. An overlapped end of a strap 11 which forms means for attaching a hook member 1 is placed longitudinally in the passage between the securing piece 3 and the bottom 21 of the clamp member 2. The clamp member 2 together with the securing piece 3 and overlapped end of the strap 11 therebetween are placed on a holder and pressed with a press machine or hammer (not shown) to flatten the arcuate side walls 23 of the clamp member 2 the, as well, hammers flat the bottom ends 42 of the rivets 4 which pierce the strap 11 and plunge into corresponding openings 22 in the flat bottom 21 of the clamp member 2 from openings 31 in the securing member 3 to prevent slipping among the securing member 3, the strap 11 and the clamp member 2.

It is intended that all matter contained in the above description or shown in the accompanying drawing be interpreted as illustrative and not in a limiting sense. It is also to be understood that the following claim is intended to cover all of the generic and specific features of the invention herein described.

What is claimed is:

1. An attachment device for strap end comprising:
   an elongated clamp member made of deformable material and having a flat bottom formed with a plurality of openings and opposed arcuate side walls defining a space therebetween;
   a securing piece having a plate body formed with a plurality of openings and dimensioned to be located in the space defined in the clamp member over the flat bottom of the clamp member to define a passageway along a longitudinal direction between the securing piece and clamp member for extension of an overlapped section of a strap with openings of the securing piece corresponding the openings of the clamp member; and
   a plurality of rivets for insertions through corresponding openings of the securing piece and clamp member, each having a flattening top end and a bottom end shaped to pierce the overlapped section of the strap and being flattened under the flat bottom of the clamp member through a pressing operation.

* * * * *